(12) United States Patent
Hauer et al.

(10) Patent No.: US 7,448,512 B2
(45) Date of Patent: Nov. 11, 2008

(54) DEVICE FOR CLOSING AN OPENING, PARTICULARLY A MAN HOLE

(75) Inventors: Jean-Claude Hauer, Saulxures les Nancy (FR); Jean-Paul Pietrzak, Blenod les Pont a Mousson (FR)

(73) Assignee: Saint-Gobain Pam, Nancy (FR)

( * ) Notice: Subject to any disclaimer, the term of this patent is extended or adjusted under 35 U.S.C. 154(b) by 849 days.

(21) Appl. No.: 10/509,332

(22) PCT Filed: May 20, 2003

(86) PCT No.: PCT/FR03/01509
§ 371 (c)(1),
(2), (4) Date: Oct. 7, 2004

(87) PCT Pub. No.: WO03/100179
PCT Pub. Date: Dec. 4, 2003

(65) Prior Publication Data
US 2005/0175409 A1  Aug. 11, 2005

(30) Foreign Application Priority Data
May 24, 2002  (FR) ................................ 02 06393

(51) Int. Cl.
*B65D 43/24* (2006.01)
(52) U.S. Cl. .................. 220/817; 220/832; 404/25
(58) Field of Classification Search .............. 220/810, 220/817, 831, 832; 404/25
See application file for complete search history.

(56) References Cited

U.S. PATENT DOCUMENTS

| 1,923,481 | A | * | 8/1933 | Ford ............................ 220/484 |
| 1,925,635 | A | * | 9/1933 | Hartley ......................... 49/400 |
| 2,300,076 | A | * | 10/1942 | Ueda ........................... 220/817 |
| 4,139,114 | A | * | 2/1979 | Long et al. .................. 220/23.4 |
| 4,840,514 | A | * | 6/1989 | Defrance et al. .............. 404/25 |
| 4,914,781 | A | * | 4/1990 | Sokn et al. ..................... 16/225 |
| 7,108,447 | B2 | * | 9/2006 | Akkala et al. ................. 404/25 |

FOREIGN PATENT DOCUMENTS

| EP | 0 681 066 | 11/1995 |
| GB | 1 544 365 | 4/1979 |

* cited by examiner

*Primary Examiner*—Anthony D Stashick
*Assistant Examiner*—James N Smalley
(74) *Attorney, Agent, or Firm*—Oblon, Spivak, McClelland, Maier & Neustadt, P.C.

(57) ABSTRACT

A device for closing an opening, particularly a man hole. The device includes a frame and a cover articulated to the frame around a first axis by a hinge. The device also includes a locking mechanism having a locked configuration, whereby the cover is held open in a first position, and an unlocked configuration, whereby the cover is disposed in a second position in which the cover can be pivoted around the first axis. The hinge is designed such that, while resting on the frame, the cover can pivot around a second horizontal axis. Moreover, the cover is pivoted around the second axis to move between the two positions. The device is suitable, e.g., for cast iron man holes.

14 Claims, 6 Drawing Sheets

DEVICE FOR CLOSING AN OPENING, PARTICULARLY A MAN HOLE

The present invention relates to a device for closing an opening, particularly a street manhole, of the type that comprises
- a frame;
- a cover articulated relative to the frame around a first horizontal axis via at least one first hinge between an open position and a closed position, this hinge comprising a cover knuckle and a cooperating frame knuckle;
- a locking device having a locked configuration in which the cover is in a first position relative to the frame and is maintained in a locked-open position, and an unlocked configuration in which the cover is in a second position relative to the frame, wherein the cover can be pivoted around the first axis.

It relates in particular to cast-iron street manholes.

There are known street manholes whose cover can be locked on the frame in open position. Such a manhole is described in European Patent B 0391825.

That manhole comprises a frame and a sealing lid. Via a hinge, the sealing lid is articulated to the frame between a closed position and an open position.

The sealing lid can be locked in a locked-open position by a vertically downward displacement relative to the frame. In this position, two plane and generally vertical blocking surfaces of the sealing lid and of the frame are applied against one another in each hinge, thus preventing inadvertent closing of the sealing lid.

In order to unlock the sealing lid before reclosing it on the frame, the sealing lid must be lifted until the respective two blocking surfaces are no longer in contact with one another. Because the sealing lid is massive, a large lifting force is necessary.

The object of the present invention is to alleviate this disadvantage and to propose a device whose cover can be locked in locked-open position while requiring a relatively small lifting force for unlocking the cover prior to pivoting it in closing direction.

For this purpose, the object of the invention is a device of the aforesaid type, characterized in that the said first hinge is designed to permit pivoting of the cover, while bearing on the frame, around a second axis that extends substantially perpendicularly relative to the said first axis and horizontally in the mounted condition of the device, and in that the cover is designed to be moved from the said first position relative to the frame toward the said second position relative to the frame and vice versa by pivoting the cover around the said second axis.

According to other embodiments, the invention is provided with one or more of the following characteristics:
- the cover is articulated to the frame via a second hinge comprising a cover knuckle and a frame knuckle, and the locking device is formed by this second hinge, which is designed to lock and unlock the cover in its open position by displacement of its cover knuckle relative to its corresponding frame knuckle in a substantially radial direction relative to the said first axis;
- the device defines a plane of gravity containing the center of gravity of the cover, extending perpendicularly to the said first axis and intersecting the said first axis at a reference point, this reference point and the said second axis defining a first distance, the cover has an end point, which defines a maximum lever arm relative to the said second axis, measured along the said first axis, and a second distance, measured along the said first axis between this end point and the said second axis, is longer than the said first distance;
- the said second distance is longer than three times the said first distance;
- the said first distance is shorter than a third distance between the said second hinge and the said second axis;
- relative to the said second axis, the said reference point and the said second hinge are disposed on the same side of the said first axis;
- the said second hinge is designed to be locked by displacement of its cover knuckle substantially vertically downward in the mounted condition of the device;
- the frame knuckles are formed by seats that are upwardly open in the mounted condition of the device, and the cover knuckles are formed by pivots connected to the cover;
- the seat of the said second hinge has a depth greater than the depth of the seat of the said first hinge, measured vertically relative to the said first axis;
- the seat of the said first hinge is provided with a bottom wall on which there bears the cover knuckle of the said first hinge, and the seat of the said second hinge is provided with an opening and a blocking surface designed to cooperate with the pivot of the said second hinge when the second hinge is in locked position;
- the cover has circular general shape;
- the cover has triangular general shape and the said first hinge and the locking device are disposed on the same side of the triangle;
- the triangle is a right triangle, the said same side of the triangle being one side of the right angle of the triangle, and the locking device is situated closer to the other side of the right angle than the said first hinge;
- the cover is a sealing lid; and
- the locked-open position and the closed position define an angle of substantially 90° between one another.

The invention will be better understood upon reading the description hereinafter, given solely by way of example and with reference to the attached drawings, wherein:

FIG. 1 illustrates a street manhole according to the invention, denoted by the general reference 2.

This manhole 2 is provided with a frame 4 and a sealing lid 6, both made of cast iron. Relative to frame 4, sealing lid 6 is articulated around a first generally horizontal axis X-X.

Figure 4:
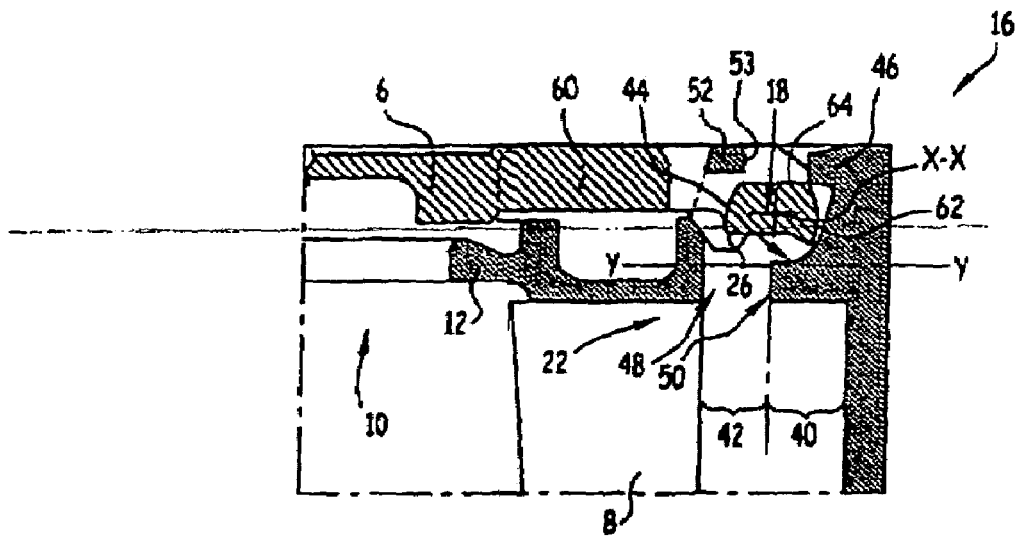
FIG. 4 is a cross-sectional view along line IV-IV of FIG. 3B, the sealing lid being in its closed position.
Figure 5:
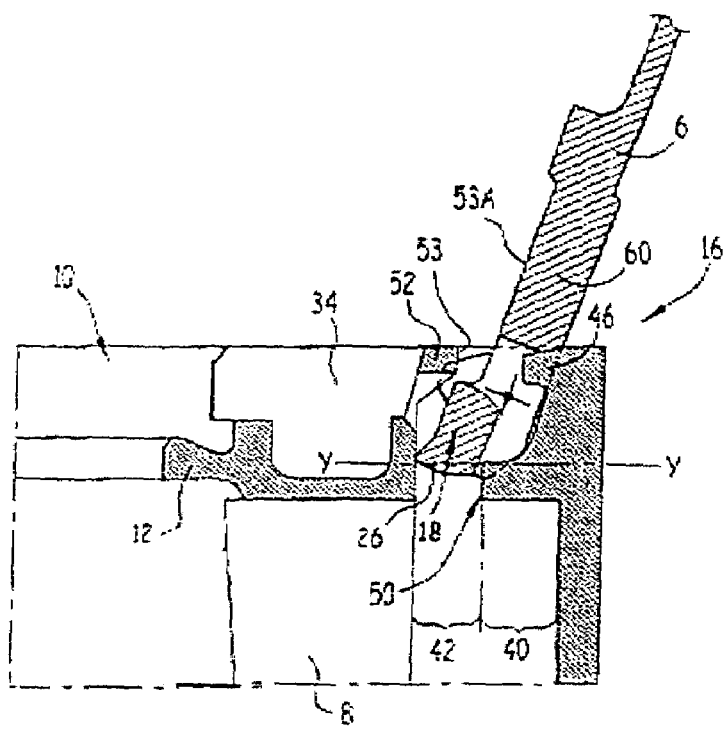
FIG. 5 is a cross-sectional view along line V-V of FIG. 3B, the sealing lid being in its maximum opened position.
Figure 6:
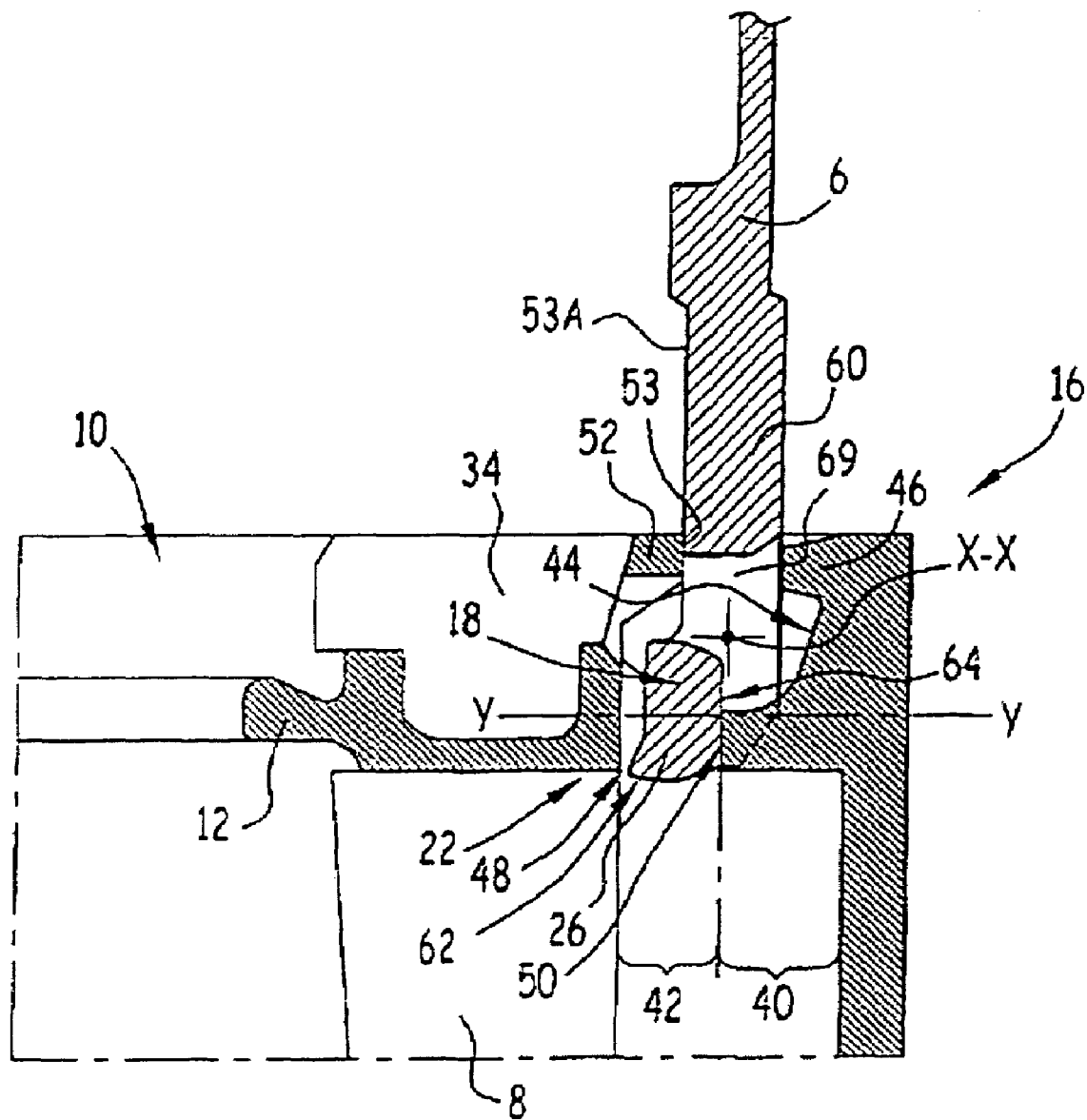
FIG. 6 is a cross-sectional view along line VI-VI of FIG. 3B, the sealing lid being in its open position, in locked condition.
Figure 7:
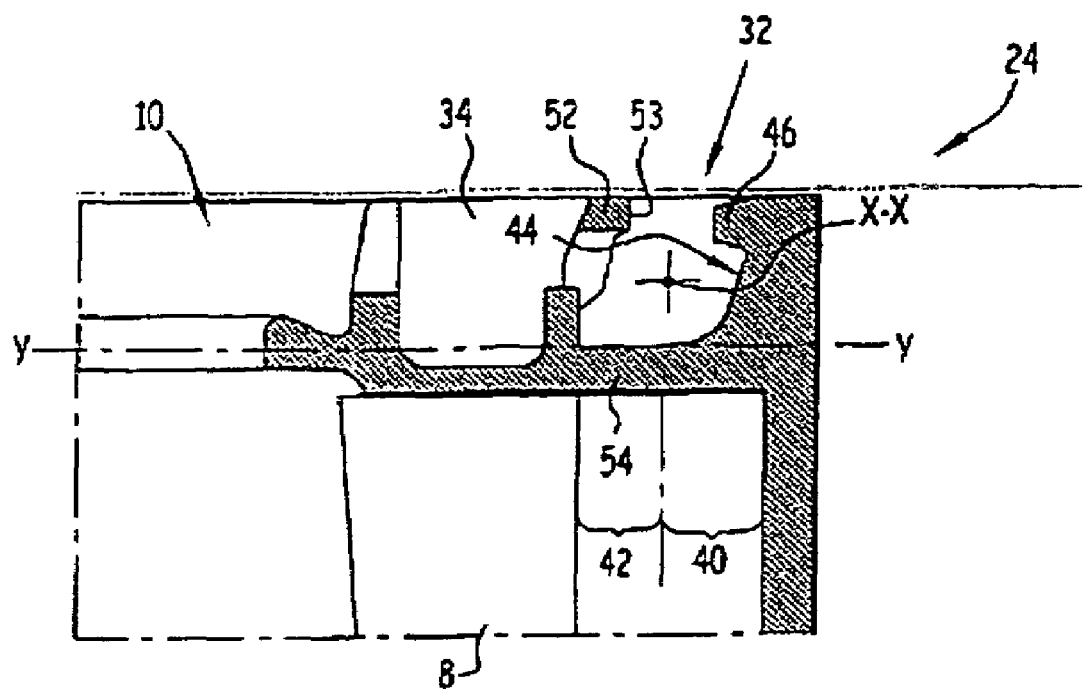
FIG. 7 is a cross-sectional view along line VII-VII of FIG. 3A.

Frame 4 is provided with a base member 8, which defines a circular opening 10 (FIGS. 4 to 6). In the mounted condition of manhole 2, this opening 10 is placed in the extension of a conduit (not illustrated) or shaft whose axis is generally vertical.

Base member 8 is provided on the inside circumference of opening 10 with an inside peripheral projection 12, on which there is disposed an elastomeric seal (not illustrated). This projection 12 serves as bearing surface for the sealing lid when this is in closed position.

Sealing lid 6 has the general shape of a circular disk, whose diameter corresponds approximately to the diameter of opening 10. The sealing lid has a center of gravity G (see FIGS. 1 and 2), a dead weight P and, measured in the direction of axis X-X, a dimension E that in this case corresponds to the diameter of the sealing lid.

Manhole 2 is also provided with first and second hinges 14, 16, which connect the sealing lid to the frame and ensure articulation of sealing lid 6 relative to frame 4, ensuring articulation of sealing lid 6 relative to frame 4 around axis X-X. Thus sealing lid 6 can be displaced between a maximum opened position, in which the sealing lid is pivoted by approximately 110° relative to the horizontal (FIG. 5) while being maintained in stable bearing condition, and a closed position in which the sealing lid is generally horizontal (FIG. 4), via an open position, in which the sealing lid is generally vertical (FIG. 6).

Each of the hinges 16, 14 comprises a sealing lid knuckle 18, 20 integral with sealing lid 6 and a frame knuckle 22, 24 integral with frame 4.

Second hinge 16 forms a device for locking sealing lid 6 in its locked-open position. This hinge 16 has an unlocked configuration (FIG. 1), in which the sealing lid can be displaced from its locked-open position to its closed position, and a locked configuration (FIGS. 2 and 6), in which sealing lid 6 is maintained in its locked-open position and cannot pivot around axis X-X.

First hinge 14 does not have any means for locking sealing lid 6 in open position, and in addition is designed to permit pivoting of sealing lid 6 around a second axis Y-Y when sealing lid 6 is in its locked-open position. Second axis Y-Y extends substantially horizontally in the mounted condition of manhole 2, perpendicularly relative to axis X-X, and extends through first hinge 14. This pivoting of sealing lid 6 around axis Y-Y moves second hinge 16 from its locked configuration to its unlocked configuration and vice versa.

When sealing lid 6 is in its locked-open position with second hinge 16 in its unlocked configuration, manhole 2 defines a plane of gravity P-P that contains the center of gravity G and that extends perpendicularly relative to axis X-X. This plane P-P intersects axis X-X at a reference point L. The distance between this reference point L and second axis Y-Y is denoted by $d_1$. This distance $d_1$ is measured in the direction of axis X-X. The distance $d_1$ is longer than 0 and preferably ranges between 0.1 times and 0.5 times the dimension E.

Relative to second axis Y-Y, the reference point L is located on the same side of axis X-X as hinge 16.

In addition, the manhole defines a second distance $d_2$, which is the distance between axis Y-Y and an end point H of sealing lid 6. End point H is formed by that end of the sealing lid which defines a maximum lever arm relative to axis Y-Y, measured along axis X-X. Preferably, the distance $d_2$ is longer than three times the distance $d_1$.

Figure 1:
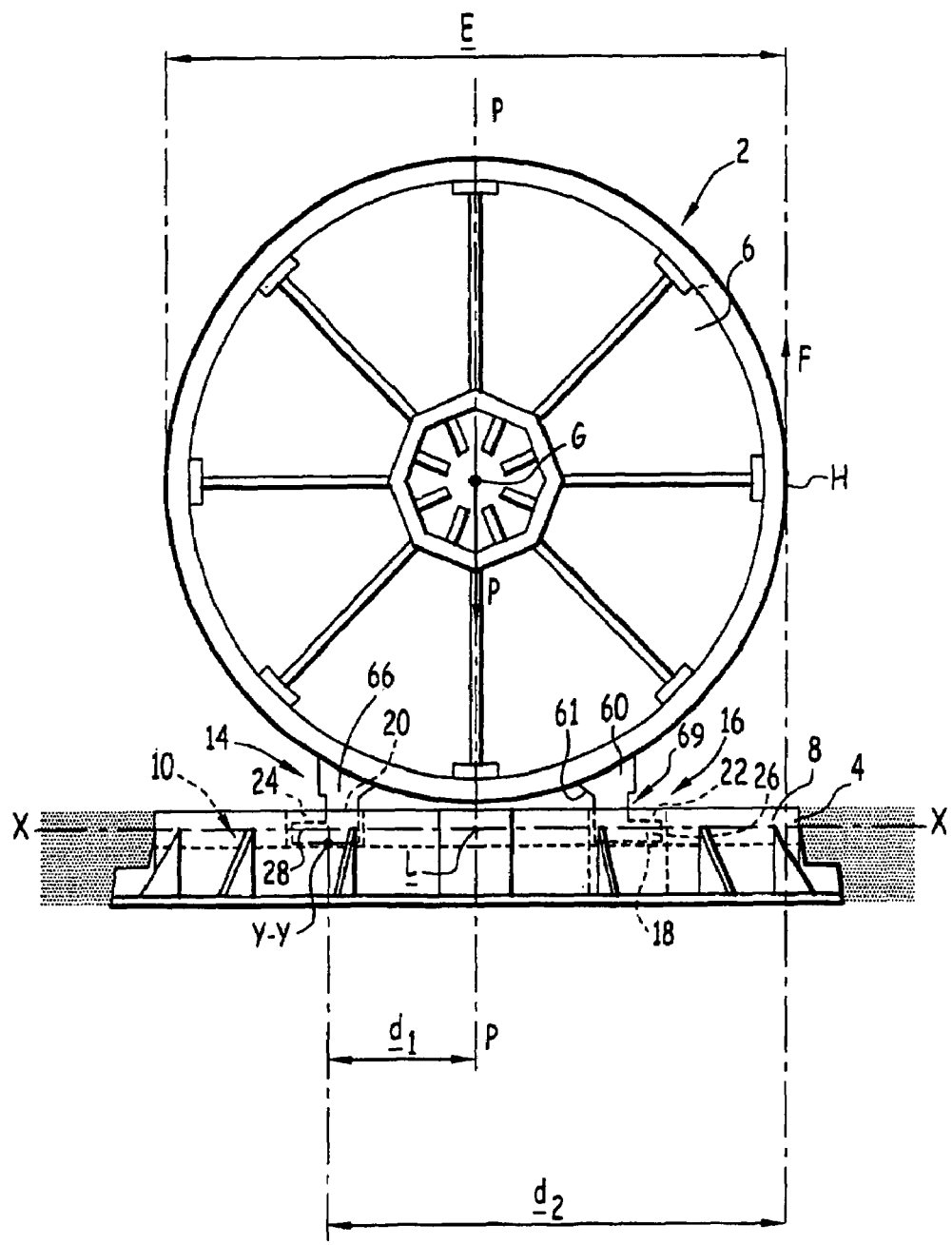
FIG. 1 is a face view of a street manhole according to the invention, the sealing lid being in its open position, in unlocked condition.
Figure 2:
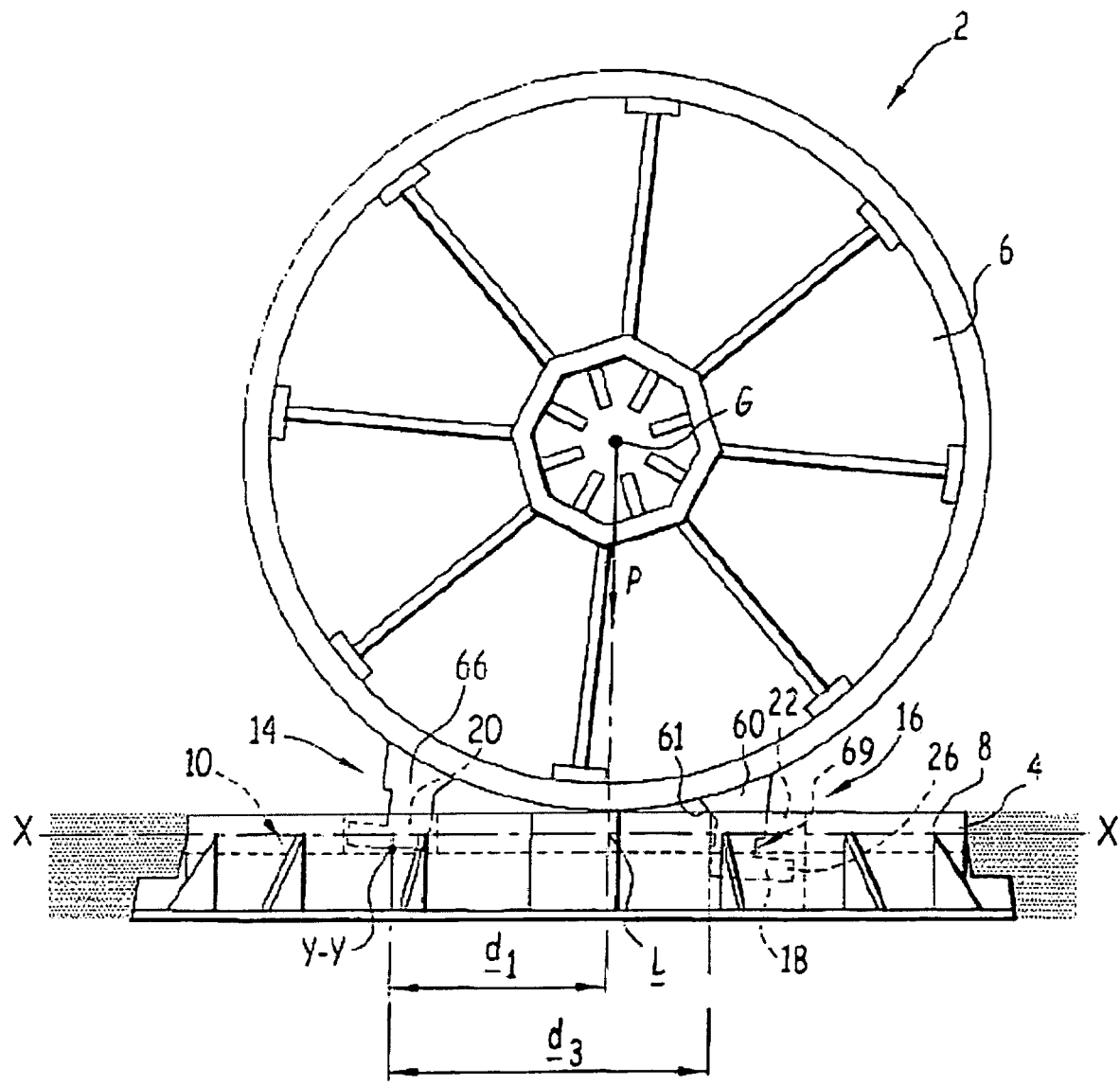
FIG. 2 is a view analogous to that of FIG. 1, the sealing lid being in its locked-open position.

Consequently, when sealing lid 6 is grasped close to point H in order to pivot it around axis Y-Y for the purpose of guiding hinge 16 from its locked configuration to its unlocked configuration, the needed lifting force F is smaller than the dead weight P of the sealing lid in the ratio d1/d3 (FIG. 1).

In the present case, each of the sealing lid knuckles 18, 20 is composed of a pivot 26, 28, while each of the frame knuckles 22, 24 is composed of a seat 30, 32 for receiving the associated pivot.

Figure 3A:
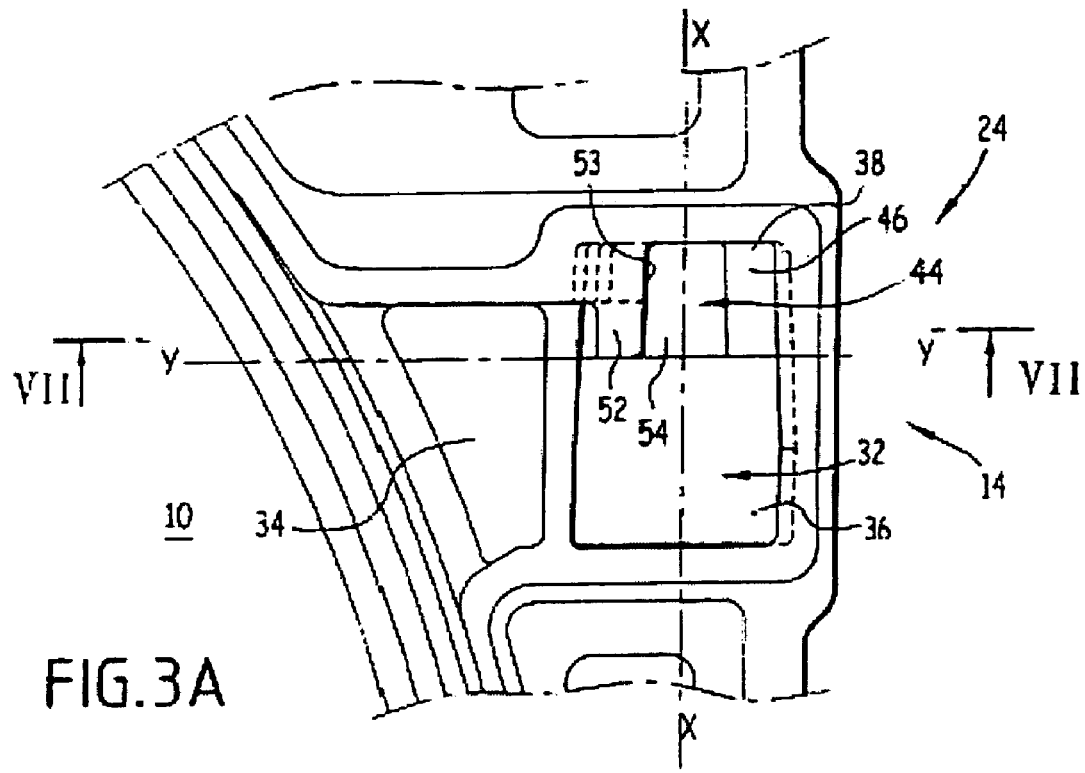
FIGS. 3A and 3B are overhead views of the seats of the hinges of the manhole according to the invention, the sealing lid not being illustrated.
Figure 3B:
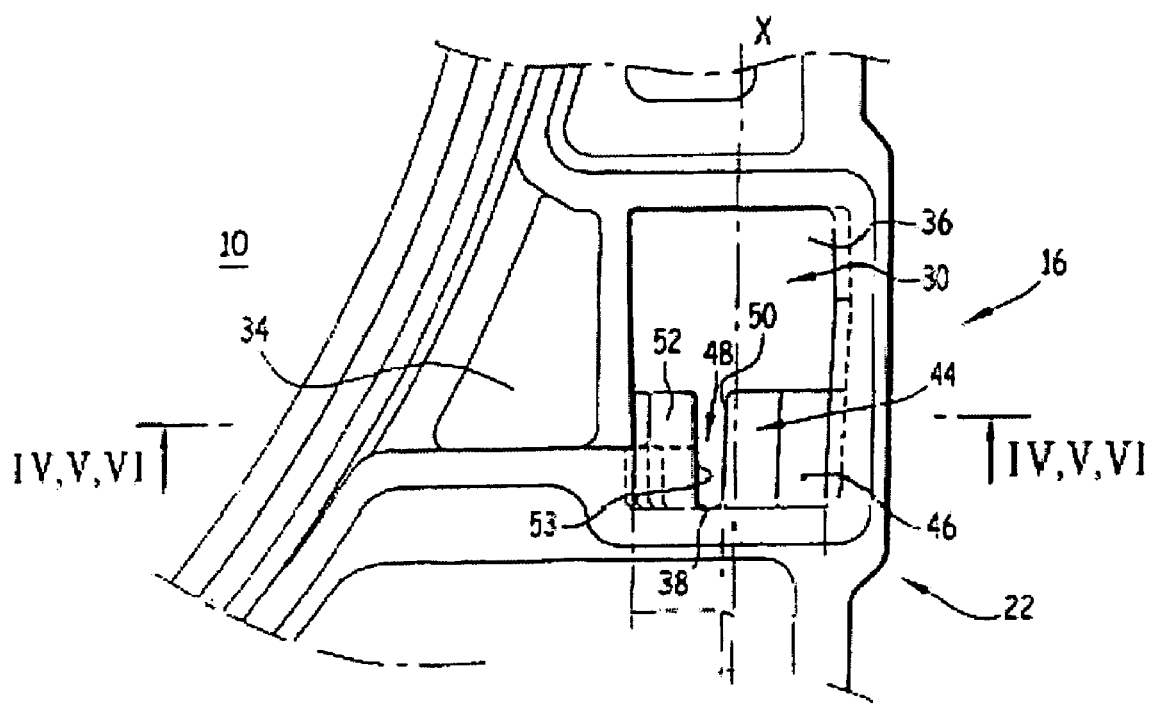

Each of the seats 30, 32 is composed of an upwardly open cavity (FIGS. 3A and 3B).

As is evident from FIG. 3B, seat 30 of second hinge 16 is generally L-shaped when viewed from above. A first portion 34 of seat 30, which opens into opening 10 and forms a first leg of the L, has a depth smaller than the rest of seat 30. A second central portion 36 of seat 30 comprises a hole passing completely through the thickness of the frame. A third portion 38 of the seat, forming the other leg of the L, is divided into two regions 40, 42.

First region 40 extends away from first portion 34. It has (FIGS. 4 to 6) a bottom profile 44 in the form of a partial cylinder with circular cross section, whose axis coincides with axis X-X. This profile 44 constitutes a hinge surface that forms a cam for pivot 26. A first lip 46 forms an upper rim of this region 40 and partly straddles bottom profile 44.

Second region 42 is disposed between first region 40 and first portion 34 of the seat. This region 42 comprises a through hole 48 for receiving pivot 26 when hinge 16 is in its locked configuration (FIG. 6). At the interface between the two regions 40, 42, seat 30 forms a plane blocking surface 50, which extends vertically.

A second lip 52 forming an upper rim of this second region 42 is disposed opposite first lip 46 and is equipped with a blocking surface 53, which is directed toward this lip 46.

Relative to plane P-P (see FIG. 3A), seat 32 of first hinge 14 is substantially symmetrical to seat 30 of second hinge 16, such that third portion 38 of second seat 32 extends along axis X-X on the side opposite first seat 30.

The elements of this seat 32 corresponding to the elements of seat 30 are denoted by like references. As a difference, third portion 38 of this seat 32 has a bottom wall 54 which is disposed in second region 42 and which extends from first region 40 to first portion 34 of seat 32. This bottom wall 54 is joined substantially tangentially to the cam-forming hinge surface constituted by bottom profile 44, such that this seat 32 does not have an opening 48 and therefore does not have a blocking surface 50.

As a consequence, seat 30 of second hinge 16 has a depth greater than the depth of seat 32 of first hinge 14, as measured vertically relative to axis X-X in the mounted condition.

Pivot 26 of second hinge 16 is fixed to sealing lid 6 via a connecting portion 60 that projects from the rim of sealing lid 6 and is integral therewith. Pivot 26 extends substantially perpendicularly to connecting portion 60, substantially in the plane of sealing lid 6.

Connecting portion 60 is provided with a bearing surface 61 that extends at about 45° relative to pivot 26. In the open condition of sealing lid 6, and when second hinge 16 is in its locked configuration, bearing surface 61 is applied against an upper rim of seat 30 (see FIG. 2). The distance between the point at which bearing surface 61 bears on seat 30 and axis Y-Y, measured along axis X-X, is denoted by $d_3$. The distance $d_1$ is shorter than the distance $d_3$.

Connecting portion 60 is also provided with a blocking surface 53A extending parallel to the general plane of sealing lid 6. Blocking surface 53A is designed to cooperate with lip 52 along the surface 53 thereof when sealing lid 6 is in locked-open position. Connecting portion 60 is also provided with an undercut 69 for passage of lip 52 along the axis of pivots 26 in order to permit pivoting of the sealing lid in closing direction.

Undercut 69 is machined into blocking surface 53A.

Pivot 26 has substantially cylindrical shape. It has a hinge surface 62 which is complementary to the hinge surface of seat 44 and which is directed toward a side opposite sealing lid 6. Pivot 26 also has a flat blocking surface 64 which is joined to hinge surface 62, and which extends parallel to the general plane of the sealing lid. This blocking surface 46 is intended to come into contact with flat blocking surface 50 of seat 30 when sealing lid 6 is in locked-open position.

Pivot 28 of first hinge 14 is fixed to sealing lid 6 by a connecting portion 66 and, relative to plane P-P, is symmetrical to pivot 26 of second hinge 16. It will be noted that the generating lines of the hinge surfaces of pivots 26, 28 are identical.

Street manhole 2 according to the invention functions in the following manner.

Initially, sealing lid 6 is in its horizontal closed position on the frame (FIG. 4).

In order to open manhole 2, sealing lid 6 is pivoted upward. In a first step, it pivots around axis X-X by cooperation of the hinge surfaces of each of the two hinges 14, 16. Pivots 28, 26 are then located substantially in first regions 40 of the seats. When sealing lid 6 is in its locked-open position, or in other words pivoted by 90° relative to its closed position, pivoting is continued beyond this position to its maximum opened position (FIG. 5). Connecting portions 60, 66 are then applied against the upper rims of seats 30, 32, and pivots 26, 28 are pushed toward the second regions 42 of seats 30, 32. When pivot 26 of second hinge 16 is located above opening 48, sealing lid 6 pivots around axis Y-Y while bearing on bottom wall 54 via pivot 28, and pivot 26 penetrates partly into opening 48 until it becomes applied against that surface of the frame which is located opposite blocking surface 50, while its connecting portion 60 is applied against lip 46 (FIG. 5). The sealing lid is locked by pivoting it back toward its locked-open position, pivot 26 then penetrating completely into opening 48. In this way, second hinge 16 is in its locked configuration.

In this position, blocking surfaces 50, 64 as well as 53, 53A are applied against one another (FIG. 6), thus preventing any inadvertent closing of sealing lid 6. Manhole 2 is then disposed in the configuration illustrated in FIG. 2.

In order to close sealing lid 6 once again, it is sufficient to grasp it and pivot it upward around axis Y-Y, causing pivot 26 to be drawn out of opening 48 and thus second hinge 16 to be moved into its unlocked configuration (FIG. 1). Given that sealing lid 6 bears via its pivot 28 on bottom wall 54 of first hinge 14 during this pivoting movement around axis Y-Y, the pivoting force necessary to release pivot 26 from opening 48 is smaller than the dead weight P of the sealing lid.

The device for locking the sealing lid in its open position can be composed of other means. For example, it may comprise a projection disposed on the sealing lid in such a way that, when the sealing lid is pivoted into its locked-open position, the said projection slides snugly into a corresponding cavity machined into the frame.

Figure 8:
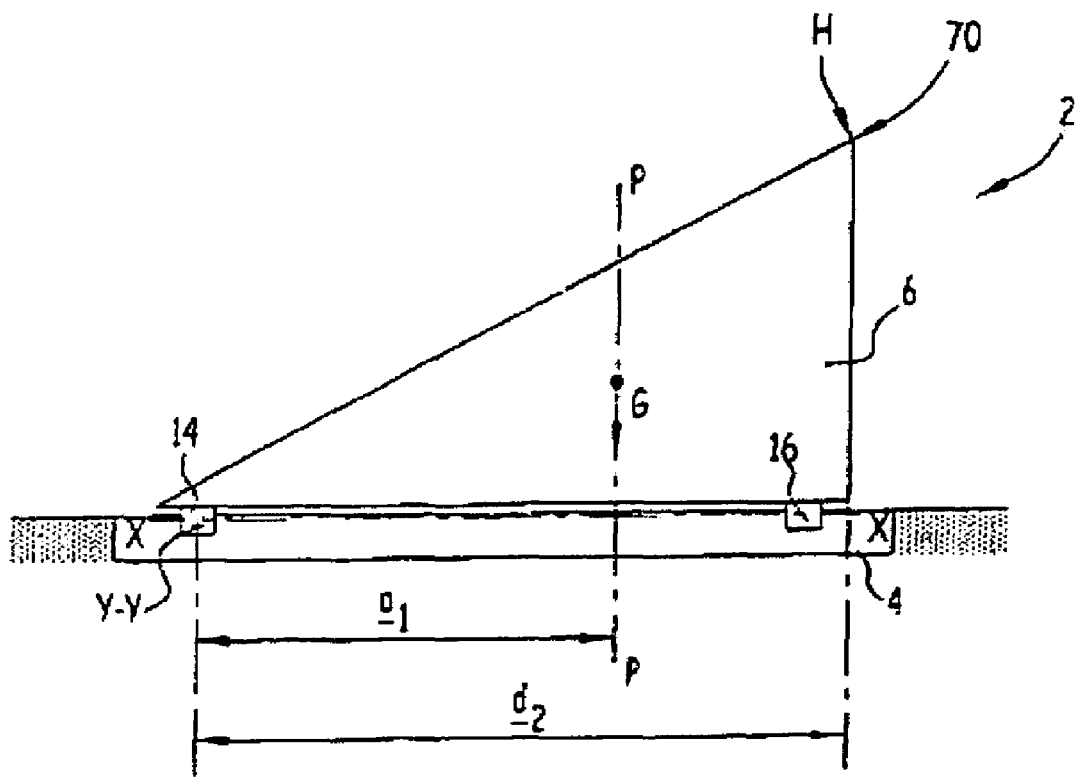
FIG. 8 is a schematic view of a second embodiment of a manhole according to the invention.

FIG. 8 illustrates a second embodiment of the manhole according to the invention. Only the differences compared with the aforesaid manhole will be described, like elements being denoted by like references.

Sealing lid 6 has the general shape of a right triangle, such that its center of gravity G is not situated midway between the two hinges 14, 16 disposed at the ends of the same side of the right angle of the right triangle. Advantageously, the first hinge 14, defining pivoting axis Y-Y, is situated at the position of one corner of the triangle. Consequently, the sealing lid can be easily grasped at a free corner 70 of the triangle, located at the distance $d_2$ from first hinge 14, then pivoted around axis Y-Y in such a way as to move second hinge 16 into its unlocked configuration. Pivoting of sealing lid 6 then necessitates a small pivoting force.

In addition, by virtue of the geometry of the sealing lid, the fact that the lifting force is no longer applied to the center of gravity has no influence on unlocking in this case, because only one of the hinges is used for locking.

In general, in the case in which the triangle is not an isosceles triangle, first hinge 14 is disposed close to a corner whose angle is smaller than the angle of the corner associated with locking device 16.

As an alternative embodiment, the sealing lid can be provided with a single connecting portion equipped with two pivots projecting from both sides of the connecting portion, only one of these pivots being locked in locked-open position on both sides thereof.

The invention is applicable to street or sidewalk manholes, of cast iron, for example, to devices such as trashracks for capping sewer inlets, and to devices such as trapdoors for closing technical inspection chambers of an underground cable network.

The invention claimed is:

1. A device for closing an opening, comprising:
    a frame;
    a cover articulated relative to the frame around a first horizontal axis by at least one first hinge between an open position and a closed position, the first hinge comprising a first cover knuckle and a cooperating first frame knuckle;
    a locking device having a locked configuration in which the cover is in a first position relative to the frame and is maintained in a locked-open position, and an unlocked configuration in which the cover is in a second position relative to the frame, wherein the cover is configured to be pivoted around the first axis,
    wherein the first hinge is configured to permit pivoting of the cover, while bearing on the frame, around a second axis that extends substantially perpendicularly relative to the first axis and horizontally in a mounted condition of the device, and wherein the cover is configured to be moved from the first position relative to the frame toward the second position relative to the frame and vice versa by pivoting the cover around the second axis,
    wherein the cover is articulated to the frame by a second hinge comprising a second cover knuckle and a corresponding second frame knuckle, and wherein the locking device is formed by the second hinge, which is configured to lock and unlock the cover in its open position by displacement of the second cover knuckle relative to the second frame knuckle in a substantially radial direction relative to the first axis.

2. A device according to claim 1, wherein the device defines a plane of gravity containing the center of gravity of the cover, extending perpendicularly to the first axis and intersecting the first axis at a reference point, the reference point and the second axis defining a first distance, wherein the cover has an end point, which defines a maximum lever arm relative to the second axis, measured along the first axis, and wherein a second distance, measured along the first axis between the end point and the second axis, is longer than the first distance.

3. A device according to claim 2, wherein the second distance is longer than three times the first distance.

4. A device according to claim 2, wherein the first distance is shorter than a third distance between the second hinge and the second axis.

5. A device according to claim 2, wherein, relative to the second axis, the reference point and the second hinge are disposed on a same side of the first axis.

6. A device according to claim 1, wherein the second hinge is configured to be locked by displacement of the second cover knuckle substantially vertically downward in the mounted condition of the device.

7. A device according to claim 6, wherein the first and second frame knuckles are formed by seats that are upwardly open in the mounted condition of the device, and wherein the first and second cover knuckles are formed by pivots connected to the cover.

8. A device according to claim 7, wherein the seat of the second hinge has a depth greater than a depth of the seat of the first hinge, measured vertically relative to the first axis.

9. A device according to claim 8, wherein the seat of the first hinge is provided with a bottom wall on which the first cover knuckle of the first hinge bears, and wherein the seat of the second hinge is provided with an opening and a blocking surface configured to cooperate with the pivot of the second hinge when the second hinge is in its locked position.

10. A device according to claim 1, wherein the cover has a circular general shape.

11. A device according to claim 1, wherein the cover has a triangular general shape and the first hinge and the locking device are disposed on a same side of the triangular shape.

12. A device according to claim 11, wherein the triangle is a right triangle, the same side of the triangle being one side of the right angle of the triangle, and wherein the locking device is situated closer to the other side of the right angle than the first hinge.

13. A device according to claim 1, wherein the cover is a sealing lid.

14. A device according to claim 1, wherein the locked-open position and the closed position define an angle of substantially 90° between one another.

* * * * *